United States Patent
Ekin et al.

(10) Patent No.: US 9,720,937 B2
(45) Date of Patent: Aug. 1, 2017

(54) RELEVANCE FEEDBACK ON A SEGMENT OF A DATA OBJECT

(75) Inventors: Ahmet Ekin, Eindhoven (NL); Devrim Unay, Istanbul (TR)

(73) Assignee: Koninklijke Philips N.V., Eindhoven (NL)

( * ) Notice: Subject to any disclaimer, the term of this patent is extended or adjusted under 35 U.S.C. 154(b) by 683 days.

(21) Appl. No.: 13/133,662

(22) PCT Filed: Dec. 18, 2009

(86) PCT No.: PCT/IB2009/055846
§ 371 (c)(1),
(2), (4) Date: Jun. 9, 2011

(87) PCT Pub. No.: WO2010/073201
PCT Pub. Date: Jul. 1, 2010

(65) Prior Publication Data
US 2011/0246466 A1    Oct. 6, 2011

(30) Foreign Application Priority Data
Dec. 22, 2008   (EP) ..................................... 08172511

(51) Int. Cl.
*G06F 7/00*     (2006.01)
*G06F 17/30*    (2006.01)

(52) U.S. Cl.
CPC ............... *G06F 17/30277* (2013.01)

(58) Field of Classification Search
CPC .............. G06F 17/30; G06F 17/30277; G06F 17/30011; G06F 17/30244;
(Continued)

(56) References Cited

U.S. PATENT DOCUMENTS 6,173,275 B1    1/2001 Caid et al.
6,356,664 B1 *  3/2002 Dunn ................... G11B 27/031
                                                    375/240.08
(Continued)

FOREIGN PATENT DOCUMENTS

JP    H10254901 A      9/1998
JP    2006338313 A    12/2006
(Continued)

OTHER PUBLICATIONS

Jing, F., et al.; Relevance Feedback in Region-Based Image Retrieval; 2004; IEEE Trans. on Circuits and Systems for Video Technology; 14(5)672-681.

(Continued)

*Primary Examiner* — Azam Cheema

(57) ABSTRACT

The invention relates to a method, a system (101) and a computer program product to identify a particular data object of a data type in a database (104) that comprises data objects of the data type. The system (101) comprises a query composition unit (102) to compose a search query to identify a candidate data object being a candidate for the particular data object. A search unit (103) identifies the candidate data object in the database (104) based on the search query. A presentation unit (105) presents the candidate data object to the user. A feedback receiving unit (106) receives user feedback on the relevance or irrelevance of a segment of the candidate data object. The search unit (103) further identifies an improved candidate data object in response to the received user feedback. The improved candidate data object is an improved candidate for the particular data object.

19 Claims, 4 Drawing Sheets

(58) Field of Classification Search
CPC .............. G06F 17/30867; G06F 3/048; G06F 17/30253; G06F 17/30017
See application file for complete search history.

(56) References Cited

U.S. PATENT DOCUMENTS

| | | |
|---|---|---|
| 6,408,293 B1 | 6/2002 | Aggarwal et al. |
| 6,643,643 B1 * | 11/2003 | Lee .................. G06F 17/30247 |
| 2003/0013951 A1 | 1/2003 | Stefanescu et al. |
| 2005/0065929 A1 | 3/2005 | Rui |
| 2006/0110073 A1 * | 5/2006 | Matsushita ....... G06F 17/30247 382/305 |
| 2006/0248044 A1 | 11/2006 | Zhang et al. |
| 2011/0246466 A1 | 10/2011 | Ekin et al. |

FOREIGN PATENT DOCUMENTS

| | | | |
|---|---|---|---|
| KR | 20080018631 A | | 2/2008 |
| WO | WO 00/18128 | * | 3/2000 |
| WO | 0225588 A2 | | 3/2002 |

OTHER PUBLICATIONS

Ko, B., et al.; FRIP; A Region-Based Image Retrieval Tool Using Automatic Image Segmentation and Stepwise Boolean AND Matching; 2005; IEEE Trans. on Multimedia; 7(1)105-113.

Tian, Q., et al., Combine User Defined Region-of-Interest and Spatial Layout for Image Retrieval; 2000, IEEE Conf. on Image Processing; 3:746-749.

Torres, J. M., et al.; Semantic Image Retrieval Using Region-Based Relevance Feedback; 2006; Adaptive Multimedia Retrieval; 4398:192-206.

Wang, T., et al.; Improving Retrieval Performance by Region Constraints and Relevance Feedback; 2004; J. Comput. Sci. & Technol.; 19(3)413-422.

* cited by examiner

RELEVANCE FEEDBACK ON A SEGMENT OF A DATA OBJECT

FIELD OF THE INVENTION

The invention relates to the field information retrieval and more specifically to the field of systems, methods and computer program products for identifying a particular data object of data type in a database comprising data objects of the data type.

BACKGROUND OF THE INVENTION

Information retrieval systems search in a database to retrieve information the user is looking for. In information retrieval systems the biggest challenge is to understand the user's needs. A system based on keyword search often has a limitation in the query language and indexation of the database. For the user it is difficult to express accurately in keywords what he is looking for. Information retrieval in an image based database is even more difficult, because it is difficult for systems to interpret an image in the same manner as a human being. A successful paradigm to solve this problem has been "relevance feedback". Such a system retrieves candidate data objects that match the search query, the user reviews the retrieved candidate data objects and provides user feedback on the relevance or irrelevance of the candidate data objects. The system learns from the user feedback to improve its search performance. If a candidate data object is similar to a particular data object for which the user is searching, the user selects the candidate data object as being relevant for the search. If a candidate data object is not similar to the user's intensions or even a completely wrong search result, the user selects the data object as being irrelevant for the search. Thus, the system learns from the feedback that it has to search for data objects that are similar to the relevant candidate data objects and that are not similar to the irrelevant candidate data objects.

A system for image retrieval is described in an article by Qi Tian, et al, entitled "Combine user defined region of interest and spatial layout for image retrieval", in Proc. of IEEE 2000 International Conference on Image Processing (ICIP'2000), pp. 746-749, Vol. 3, Vancouver, BC, Canada, Sep. 10-13, 2000. The system disclosed in the reference document tries to find image objects in a database of image objects based on a query image. The system has to find images that are similar to the query image. The images in the database are subdivided in a grid of pre-defined regions. For every region a feature vector is present in the database. The system compares the query image with the images in the database to find images that have feature vectors for regions similar to the feature vectors of the regions of the query image. The images in the data with most similar feature vectors are presented to the user as return images. Return images are candidates for the image, or images, the user is looking for.

Subsequently the user has to provide relevance feedback on a number of return images such that the system learns about the intentions of the user. This feedback triggers an additional search wherein the system tries to find images that better match the intentions of the user. After a number of iterations a set of images is found by the system best matching the intentions of the user. In order to allow the system to optimally learn the intentions of the user, the system requires feedback on many return images and thus many iterations are required.

In addition, the system offers the user the possibility to define together with the query image a Region Of Interest (ROI). The user indicates to the system which part of the image has his interest and indicates as such that the system has to find similarities between the query image and the image in the database inside the ROI only. Information in the query image outside the ROI is not of interest to the user and needs to be ignored by the system. The system uses the ROI to determine weight values for the regions of the grid of regions. Regions that fall completely outside the ROI get a weight value of 0. Regions that partly overlap with the ROI get a lower weight value than the regions that completely overlap with the ROI. Regions with a low weight value will only marginally be taken into account in the search, and regions with a high weight value will influence the search results most. Each iteration the system uses the same set of weight values for the searches. Although the focus of the search is marginally better, the user has still to provide feedback on many images.

Reviewing many return images to provide feedback regarding the return image and going through many iterations is especially a disadvantage in the medical domain where the users of the systems are medical experts who have limited time and resources. Furthermore, in the case that the images need to be transmitted to a handheld device for receiving feedback, for example, to a handheld device that the medical expert uses when visiting patients, the number of wireless transmissions must be minimized because of limited available bandwidth for the handheld device.

SUMMARY OF THE INVENTION

It is an object of the invention to reduce the number of reviews of return images that are presented to the user.

The invention is defined by independent claims. Advantageous embodiments are defined in the dependent claims.

A first aspect of the invention provides a system as claimed in claim 1. A second aspect of the invention provides a method as claimed in claim 14. A third aspect of the invention provides a computer program product as claimed in claim 15.

The system in according to the first aspect of the invention provides the user with a system that comprises a query composition unit. The query composition unit composes a search query to identify a candidate data object such that the candidate data object is a candidate for the particular data object. The search query is used to inform the search unit about the intentions of the user. The user expects from the system to identify a particular data object in the database. The search query may be based on an example data object and the system has to identify a particular object that is similar to the example data object. The search query may also be based on keywords in which the intentions of the user are expressed in words. Alternatively, a combination of an example data object and keywords are used.

The system further comprises a search unit that identifies the candidate data object in the database based on the search query. The search unit may for example identify the candidate data object in the database because it has most similar keywords to the keywords of the search query. Or the search unit may, for example, identify the candidate data object that is most similar to the example data object of the search query. If the data objects are images, the similarity is for example related to average intensity, contrast, intensity distribution, distributions of the color tones of the pixels of the primary colors in the RGB color model or for example the distributions of the values of the pixels of the dimensions in other color models.

The system presents the data object to the user with a presentation unit. The presentation unit may comprise a display to display for example an image or a video fragment and the presentation unit may also comprise an amplifier with loudspeakers to play an audio fragment to the user or to play the audio of a video fragment.

The feedback receiving unit of the system receives user feedback on the relevance or irrelevance of a segment of the candidate data object. The user provides feedback to the feedback receiving unit. The feedback may be that the segment of the candidate data object is irrelevant, which means that the user indicates to the system that the segment contains information that does not match his expectations concerning the particular data object. The feedback may be that the segment of the candidate data object is relevant, which means that the user indicates to the system that the segment contains information that does match his expectations.

Subsequently, the search unit of the system identifies an improved candidate data object in response to the received user feedback. The improved candidate data object is an improved candidate for the particular data object. The system learns from the received feedback and therefore the search unit is able to find a better match in the database in relation to the intentions of the user.

The user of the system is able to provide feedback on segments of the candidate data object. A segment is a part of the data object. The segment is for example a spatial partition of a two or three dimensional data object or a temporal partition of the data object that comprises a time line. The spatial decomposition is for example a part of for example a medical image, or a sub volume of volumetric medical data. A candidate data object may be partitioned in time if the data object is for example video or audio data. The user is able to define whether the segment of the candidate data object is according to his opinion relevant or irrelevant. The advantage of relevance feedback on the segment is that the user feedback on a segment is much more accurate and expresses the intentions of the user much better than feedback on the whole data object.

If a candidate data object is presented to the user and the user is not completely satisfied with the presented candidate data object, the user does not accept the candidate data object as the data object he is searching for, which is the particular data object. The rejection is most probably based on the fact that not the whole data object, but only a segment of the candidate data object is seen as relevant or irrelevant. Providing relevance or irrelevance feedback on the whole data object ignores the fact that only a part of the candidate data object is the reason for rejecting or accepting the candidate data object as the particular data object. Therefore, feedback on the whole candidate data object is less accurate. Thus, systems that require feedback on the whole data object converge less quickly to a candidate data object that is accepted by the user as the data object he is searching for. Consequently, the system in accordance with the first aspect of the invention requires fewer reviews of data objects for providing feedback.

In particular in the medical domain providing feedback on a segment of the data object is very important because different parts of medical images provide cues for different pathologies. Thus, by providing feedback on specific segments, the system focuses more on specific pathologies.

It should be noted that providing user feedback on the relevance or irrelevance of a segment of the candidate object is conceptually different from the Region Of Interest (ROI) of the cited state of the art. With the ROI the user tells the system immediately in the initial search query that only a region of the query image must be matched with the same region of the images in the database. As such the user informs the system that it has to temporarily throw away the information in the area outside the ROI of all pictures in the database because the area outside the ROI should be ignored. Thus, the ROI of the query image is the only relevant part of the query image. The system of the cited art uses the ROI to update the weight values of the regions of the grid of regions. The updated weight values of the regions are used by the system for all searches that are executed—also for the searches after receiving relevance feedback. In the system of the cited art the user can only decide about the relevance or irrelevance of every return image as a whole.

An example of a system in accordance with the first aspect of the invention is a system with a medical database comprising MRI brain scans of patients suffering different forms of dementia and MRI brain scans of a control group of healthy patients. A doctor who obtains an MRI scan of the brain of one of his patients suffering dementia wants to identify in the database a similar MRI brain scan. The initial search query is composed on basis of the obtained MRI brain scan of the patient. The system finds in the database one or more candidate MRI brain scans that are similar to the MRI brain scan in the search query. These MRI brain scans are presented to the doctor. The doctor reviews the candidate MRI brain scans and provides the system with his feedback on at least one segment of at least one of the candidate MRI brain scans. The doctor indicates whether the segment of the candidate MRI brain scan is relevant or irrelevant for the result he is looking for. For example, the doctor may decide that in an area of the presented candidate MRI brain scan a structure is present which is not at all similar to the initial provided MRI brain scan of the patient. Therefore the doctor provides for this area the user feedback "irrelevant". It may also be the case that the presented candidate MRI brain scan looks healthy in a specific part of the MRI brain scan, while the MRI brain scan of the patient does not look healthy in the specific part of the MRI brain scan. Thus user feedback "irrelevant" is provided for the specific part of the candidate MRI brain scan. And the doctor may decide that in one of the presented candidate MRI brain scans an area is very similar to the MRI brain scan of his patient and that the area is related to one of the possible forms of dementia (for example Alzheimer's disease). Thus, the user feedback "relevant" is provided for the area that is very similar. Subsequently, the system updates the search in response to the received feedback on one or more segments and presents another list of one or more candidate MRI brain scans. Note that some of the originally presented MRI brain scans may still be in the result list after updating the search results just because they are simply very good matches.

The system in accordance with the first aspect of the invention, the method in accordance with the second aspect of the invention and the computer program product provide the user with the same benefits in relation to the reduction of the number of reviews of candidate data objects.

In an embodiment the user defines the segment of the candidate data object. The user indicates to the feedback receiving unit which part of the candidate data object is the segment. It is an advantage for the user to select the segment because in that way the user can be most accurate in his feedback. The user may, to define the segment, for example, select an area in the form of a polygon or a volume in the form of polyhedron. By receiving more accurate user feedback the system identifies an improved candidate object that better fulfils the expectations of the user and as such there is a faster convergence. It should be noted that the segment may also be another geometric shape, like a circle or a sphere.

In another embodiment the system further comprises a segment proposal unit. The segment proposal unit proposes a set of candidate segments. The candidate segments are parts of the candidate data object and are a candidate for the segment on which the user provides relevance feedback. The candidate segments are presented to the user by the presentation unit together with the candidate data object. Subsequently the feedback receiving unit receives from the user an indication which of the candidate segments is the segment on which the user wants to provide relevance or irrelevance feedback. Selecting one of the proposed candidate segments may be done quickly and as such it takes not much time for the user to provide the feedback. This especially an advantage if the user does not have much time to provide feedback to the system.

In an embodiment the data object is a medical data object, like an image of the body obtained with X-ray photography, Computer Tomography (CT) or Magnetic Resonance Imaging (MRI), a three dimensional representation of a part of the body of a patient obtained by combining several CT or MRI images, or a film in which the circulation of the blood through the vessels and the heart of a patient is visualized.

The segment proposal unit is constructed to recognize anatomically defined parts of the body in the media data object. The anatomically defined parts of the body are based on, for example, medical atlas based definitions. The anatomically defined parts are proposed as candidate segments. In the medical domain the medical expert is often searching for specific characteristics of anatomically defined parts of the body, because specific anatomically defined parts of the body provide cues for different pathologies. It is an advantage if the system presents possible segments in combination with the candidate data object that relate to the anatomical parts of the body, such that the medical expert can easily select the segment. This saves time for the medical expert.

In another embodiment the segment proposal unit proposes the set of candidate segments on basis of a partitioning of the data object according to a grid. The proposed candidate segments may be a set of partially overlapping segments, or the candidate segments may be disjoint. The whole set of candidate segments may cover the whole candidate data object. It is an advantage to partition the candidate data objects according to a grid, because it is a very fast and effective way of partitioning the candidate object. It does not cost many system resources to perform the partitioning. Another advantage may be that the data objects in the database have been partitioned in segments according to the same grid as well and that for every segment some additional information is stored. In the case that the database stores additional information related to segments according to the same grid, the search unit is able to identify much faster an improved candidate data object.

In an embodiment the feedback receiving unit receives user feedback on the relevance or irrelevance of at least two segments of the candidate data object. The more feedback is given related to different segments of the candidate data object, the more accurate the system may identify an improved candidate object, because the system learns more from the user's intentions. Furthermore, especially in the medical domain the medical expert has to review the whole data object for providing user feedback. While reviewing the whole data object the medical expert identifies in general several segments that are relevant and several segments that are irrelevant. To use the reviewing time efficiently it is an advantage to provide all observations immediately to the system. As a consequence of more user feedback per candidate data object the system converges faster to a candidate data object that is accepted by the user as the data object for which the initial search query was composed. Thus, the system requires fewer reviews of data objects and fewer iterations.

Note that the at least two segments of the candidate data object may (partially) overlap or may be disjoint. The at least two segments may also completely overlap, which is an advantage in the case of hierarchical relations between some of the segments. An example of user feedback in the case of hierarchy between the segments is: In the case of a medical data object representing the human brain, used feedback to a segment related to the Basal Ganglia is received by the feedback receiving unit. The Basal Ganglia is composed of segments such as the Globus Pallidus and the Putamen. And in addition to user feedback on the segment related to the Basal Ganglia the user may also provide separate feedback to a segment related to the Globus Pallidus and to a segment related to the Putamen.

In a further embodiment the feedback receiving unit receives a ranking of the at least two segments of the candidate data object from the user. The ranking expresses which segment is more important for the user than which other segment. The search unit uses this ranking internally to decide which of the data objects is the best improved candidate object. An expert who reviews the candidate object realizes immediately which segment is most important for identifying an improved data object and which segments are less important, but still important enough to provide feedback for. By providing user feedback in the form of the ranking of segments the system is better able to identify the improved data object and as such the improved data object better matches the intentions of the user.

In an embodiment the feedback receiving unit receives user feedback on the relevance or the irrelevance of a feature of the content of the segment of the candidate data object. While reviewing the candidate data object the user has particular reasons why a segment is relevant or irrelevant. It is an advantage to express these reasons in the form of a feature that is related to the content of the segment of the candidate data object. The user feedback in the form of feedback on the relevance or irrelevance of the feature of the content of the segment provides the system much more accurate information about the intensions of the user and as such about the improved data object that must be identified. For example, in the medical domain the medical expert discovers during a review that segments of a candidate medical image is subject to hyperintensity or hypointensity, which means lighter and darker than expected, respectively. It may be relevant or it may be irrelevant for the search that the content of a segment of the data object is subject to hyperintensity or hypointensity. And in addition the search unit may perform a faster identification of the improved data object if the database contains also information about areas of the image that are subject to hyperintensity or hypointensity. It should be noted that the user may provide relevance feedback on more than one feature of the content of the segment. For example, the content of the segment may be subject to hyperintensity and the shape of an anatomical part of the body in the segment is wrong.

In another embodiment the identification of the improved candidate object is performed by updating the search query in response to the received user feedback. The updated search query is used to identify the improved candidate object. There are known algorithms, like Rocchio's algorithm for relevance feedback, to update the search query based on received relevance feedback. These algorithms are mainly based on the fact that the initial search query is described as a feature vector, for example a feature vector that is based on the content of an example image that the user provided to the query composing unit. The search unit uses the feature vector to find data objects with similar feature vectors. The updating of the search query is done by combining the initial feature vector with arithmetic operation with the feature vectors of the candidate objects on which feedback was provided. Instead of a feature vector a feature matrix may be used, wherein, for example, the different columns are feature vectors related to different parts of the data object. Similarly to Rocchio's algorithm, the updated feature matrix is based on the initial feature matrix and with some arithmetic operations some of the columns may be updated in response to the received user feedback on the segment.

In an embodiment the identification of the improved candidate data object is performed by identifying a first list of candidate data objects and identifying a second list of candidate data objects. The first list of candidate data objects is identified on basis of the initial search query. The second list of candidate data objects is identified on basis of the received user feedback on the relevance or irrelevance of the segment. Subsequently, the improved candidate data object is selected from the first list or the second list.

By performing two identification actions two relative simple searches have to be executed. The first list of candidate objects may still be present in the search unit as a result of the initial identification of the candidate object. If the provided relevance feedback was positive ("relevant"), the second list of candidate data object has to contain data objects that have content in a part of the data object that is similar to the content of the segment of the candidate object. Similarly, if the provided feedback was negative ("irrelevant"), the second list of candidate data object has to contain data objects that have content in a part of the data object that is dissimilar to the content of the segment of the candidate object. Subsequently, the selection of the improved candidate object may be done on basis of a fairly simple criterion, like "which data object appears in both lists". Selecting the improved candidate object from the first or second list may also be done by assigning to the individual data objects in both of the lists a score, merging the lists, and selecting the data object with the highest score. The score has to express the similarity between the data object and the initial search query, or the similarity between the part of the data object and the segment of the candidate object in case of positive feedback for the segment, or the dissimilarity between the part of the data object and the segment of the candidate object in case of negative feedback for the segment.

In the embodiments different variants of user feedback are discussed, like feedback on the relevance or irrelevance of a segment, the relevance or irrelevance of a feature of the contents of a segment and a ranking of segments. It should be noted that different combinations of the variants of user feedback may be used, like providing user feedback on the relevance or irrelevance of a feature of the contents of a segment, without providing user feedback on the relevance or irrelevance of the segment.

In the embodiments different variants of segments are discussed, like user defined segments and user selected segments based on proposed anatomically defined segments or proposed segments based on a grid. It should be noted that the invention is not limited to the separate use of the variants of segments, but that different combinations of the variants of segments may be used.

It will be appreciated by those skilled in the art that two or more of the above-mentioned embodiments, implementations, and/or aspects of the invention may be combined in any way deemed useful.

Modifications and variations of the method, and/or of the computer program product, which correspond to the described modifications and variations of the system, can be carried out by a person skilled in the art on the basis of the present description.

A person skilled in the art will appreciate that the method may be applied to multidimensional image data, for example, to 2-dimensional (2-D), 3-dimensional (3-D) or 4-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

It should be noted that items which have the same reference numbers in different figures, have the same structural features and the same functions, or are the same signals. Where the function and/or structure of such an item has been explained, there is no necessity for repeated explanation thereof in the detailed description.

DETAILED DESCRIPTION

Figure 1:
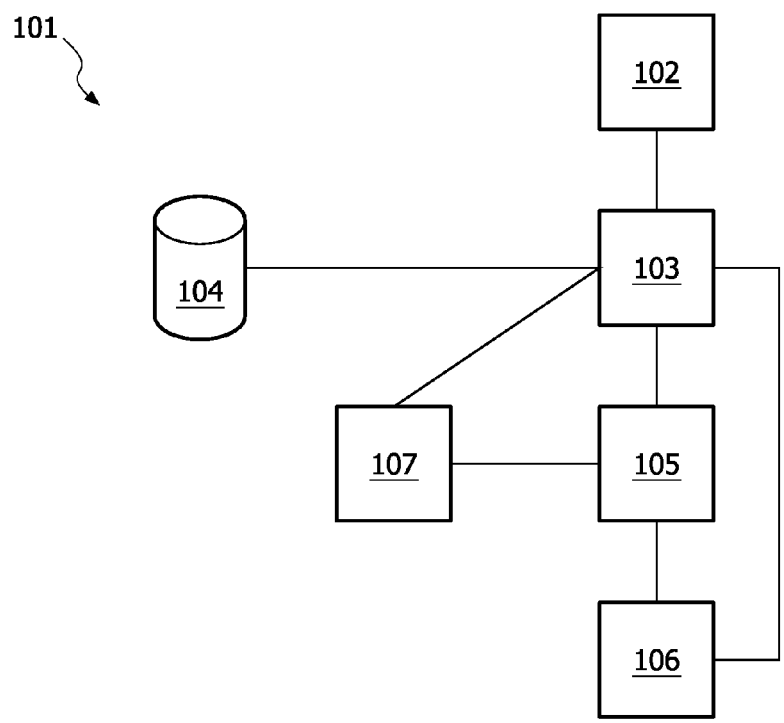
FIG. 1 shows a schematic diagram of a system for identifying a particular data object in a database.

FIG. 1 shows a schematic diagram of a system 101 to identify a particular image in a database 104. Although the embodiment is described for a database comprising images, the system may be used to identify a particular data object of another data type. For example, three dimensional representations of objects or environments, video fragments or audio fragments.

The system comprises a query composition unit 102 to compose a search query. The search query expresses the intensions of the user in relation to the particular image; it expresses what kind of image the user is looking for. The search query is used by the system 101 to identify a candidate image that is a candidate for the particular image. Based on user input the search query is composed. The user provides an example image that is used to compose the search query. In another embodiment it may be possible that the user provides keywords that describe the content of the image that he wants the system to identify.

The query composition unit 102 composes, based on the example image, a search query in the form of a feature matrix. The feature matrix describes several characteristics of the example image for several regions of the image. The columns of the feature matrix are feature vectors that describe characteristics of a part of the example image. The feature vector comprises for example the distribution of the different color tones in the R, G and B channel of the part of the example image.

The search unit 103 of the system 101 identifies, based on the search query, the candidate image in the database 104. This is done by comparing the feature matrices of the images in the database 104 with the feature matrix of the search query. Note that the database 104 may comprise the feature matrices of the images in the database 104 in case that the feature matrices were created at the moment that the database 104 was created. The search unit 103 may also extract the feature matrices from the images in the database 104 while the search unit 103 is identifying the candidate image. The identified candidate image is the image in the database 104 with the feature matrix that is most similar to the feature matrix of the search query.

The system 101 has a presentation unit 105 that presents the candidate image to the user. The presentation unit 105 comprises a display that displays the candidate image. The presentation unit may comprise other data presentation equipment, like loudspeakers to play an audio fragment.

The user feedback receiving unit 106 of the system receives user feedback for a segment of the candidate image. The user indicates whether the segment of the candidate image is relevant or irrelevant. If the segment is relevant, the user is looking for a particular image that has similar characteristics to the characteristics of the segment of the candidate image. If the segment is irrelevant, the user is looking for a particular image that has in the segment dissimilar characteristics to the characteristics of the segment of the candidate image. The feedback receiving unit 106 may comprise an input receiving device that is used by the user to define the segment of the candidate image and to indicate the relevance or irrelevance of the segment. If the display of the presentation unit 105 is for example a touch screen and the feedback receiving unit 106 is coupled to the touch detecting device of the touch screen. This allows the user to select on the touch screen a segment of the presented candidate image. Another input receiving device is for example a mouse.

Subsequently, the received user feedback at the feedback receiving unit 106 is used by the search unit 103 to identify an improved candidate image in the database 104 that better fulfils the intentions of the user. The search unit 103 may for example update the feature matrix of the search query by changing some of the columns of the feature matrix. These columns are changed on basis of the feature vector of the segment of the candidate image. Which columns are updated depends on the overlap of the segment with the parts of the images that are represented with separated feature vectors. How much the columns are updated depends on the amount of overlap between the segment and the parts of the image.

The updated feature matrix is used by the search unit 103 to identify the improved candidate image in the database 104 that has a feature matrix that is most similar to the updated feature matrix. Note that the improved candidate image may be another image than the initially identified candidate image, if the another image has a feature matrix that is most similar to the updated feature matrix. Note that the improved candidate image may be the same image as the candidate image if the feature matrix of the previously found candidate image is still most similar to the updated feature matrix.

In another embodiment the system comprises a segment proposal unit 107. The segment proposal unit 107 proposes for the candidate image a set of candidate segments. The set of candidate segments is presented by the presentation unit 105 to the user. The display of the presentation unit 105 may display areas of the different candidate segments in another color, or display the content of the area blinking, or draw a line of a specific color around the candidate segments. The feedback receiving unit 106 receives from the user a selection of candidate segments as being the segment on which the user provides feedback. The segment proposal unit 107 may subdivide the candidate image in disjoint candidate segments on basis of a grid. In the case that the images are medical images, the segment proposal unit may have knowledge about the shown parts of the body and may propose segments based on anatomically defined segment. In another embodiment the segment proposal unit 107 may comprise an edge detector to detect edges in the image that are boundaries of parts of the body. The segment proposal unit 107 may use the detected boundaries of parts of the body to propose segments.

Figure 2:
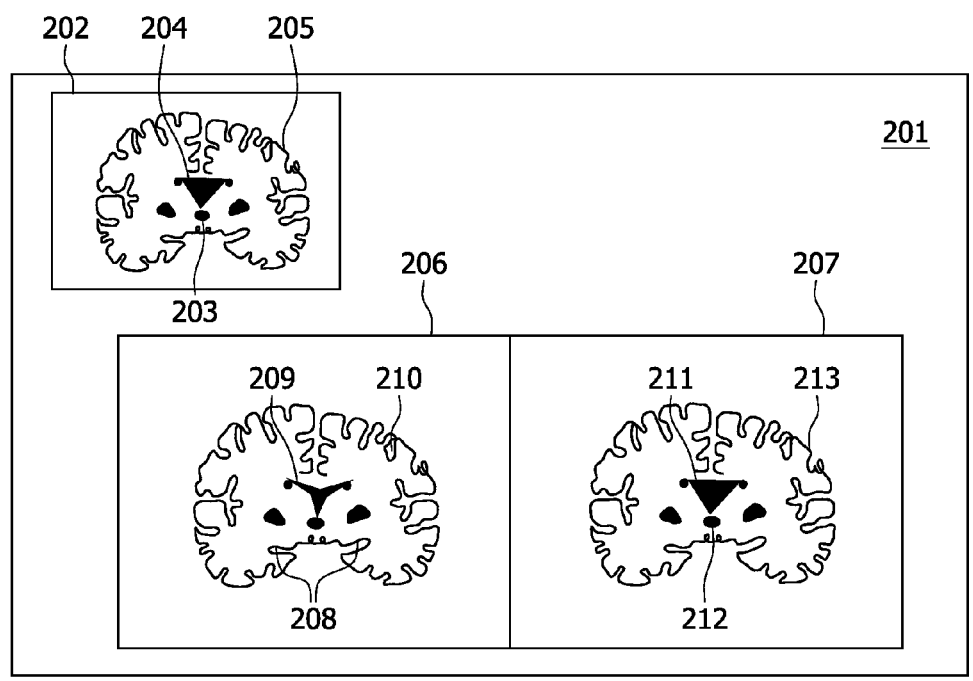
FIG. 2 shows a schematic view of the display of the presentation unit of the system.

FIG. 2 shows picture 201 displayed on a display of the presentation unit 105 according to an embodiment. Example image 202 is a slice, in coronal view, of a MRI brain scan is shown. Furthermore, a first candidate image 206 and a second candidate image 207 are shown.

The example image 202 was used by the query composition unit 102 to compose the search query. The system 101 has to find other slices in coronal view of a MRI brain scans in the database 104 that are similar to the example image 202. A medical expert may realize that the ventricles 203 and 204 are enlarged and that the size of cerebral cortex 205 on the right upper side of the example image 202 is slightly decreased compared with the left side of the brain.

The search unit 103 has identified two candidate images 206 and 207 that are similar to the example image 202. The medical expert may realize during revision of the first example image 206 that the hippocampi 208 and 209 are much smaller than usual, that the ventricle 209 has the normal size, and that the cerebral cortex at the right upper side of the image of the first candidate image 206 has been shrunk (and even more than the shrinkage in the example image 202). The second candidate image 207 shows a slice of a brain scan in which the ventricles 211 and 212 are enlarged and in which the cerebral cortex 213 has the usual size. The user feedback receiving unit 106 receives feedback on segments of the candidate images. This is shown in FIG. 3 and FIG. 4.

The slices of the MRI brain scan are shown in coronal view. In another embodiment slices in an axial view and/or sagittal view are used by the system 101 to identify a candidate slice in axial and/or sagittal view in the database 104. In another embodiment the shown MRI brain scan may be a volumetric representation, which is a three dimensional view.

Figure 3:
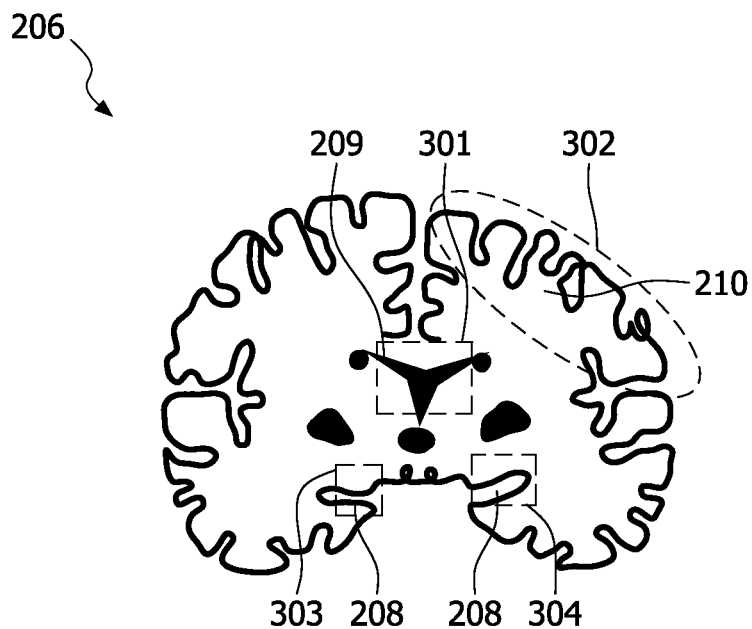
FIG. 3 shows a schematic view of a slice of a MRI brain scan with selected segments.
Figure 4:
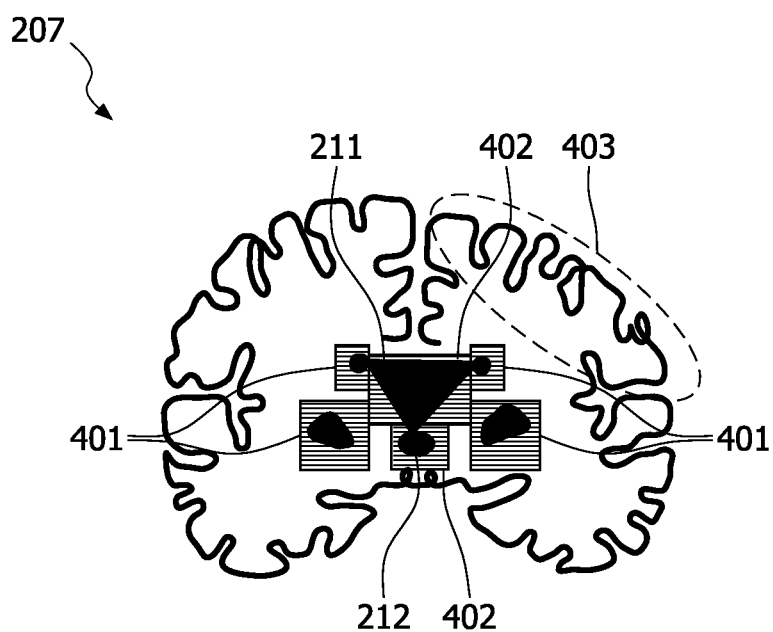
FIG. 4 shows a schematic view of a slice of a MRI brain scan with proposed candidate segments.

In FIG. 3 the first candidate image 206 is shown. The medical expert who is using the system 101 defines in the first candidate image 206 four segments 301, 302, 303 and 304. The medical expert indicates to the feedback receiving unit 106 that the segment 301 is irrelevant because in his opinion the ventricle 209 is not enlarged in comparison to the ventricle 204 of the example image 202. The medical expert indicates that segment 302 is relevant because in his opinion is the shrinkage of the cerebral cortex 210 is similar to the shrinkage of the cerebral cortex 205 of the example image 202. Furthermore the medical expert provides irrelevance feedback for the segments 303 and 304, because in his opinion he is not looking for a particular image in which the hippocampi are smaller than usual.

In an embodiment the medical expert is able to provide additional feedback to the feedback receiving unit 106 in the form of a ranking of the segments 301, 302, 303 and 304. If it is much more important for the medical expert that the cerebral cortex 210 is subject to shrinkage, than the fact that the hippocampi 208 are not subject to shrinkage, the medical expert may provide a ranking of (from most important to least important): 302, 301, 303, 304.

Segments 301 to 304 are a spatial partitioning of the candidate image 206. In another embodiment the data objects in the database are three dimensional representations of the brain. The presentation unit is adapted to present the three dimensional images of the brain and offers the user a user interface in which the user is able to rotate the displayed image and to look inside the structure of the brain. The feedback receiving unit receives, in the case of a three dimensional representation, relevance feedback on a segment that is a volumetric partitioning of the three dimensional representation of the brain.

FIG. 4 shows the second candidate image 207. In FIG. 4, according to a further embodiment, the segment proposal unit 107 proposed candidate segments 401 and 402. The candidate segments 401 and 402 are selected by the segment proposal unit 107 on basis of anatomically defined parts of the brain, for example each of the two candidate segments 402 is related to a ventricle. The medical expert who reviews the image realizes that he wants to give his feedback for the candidate segments 402 because they cover the part of the image in which the ventricles 211 and 212 are enlarged. Consequently, the medical expert provides the feedback receiving unit 106 with an indication that he wants to select candidate segments 402 as the segments on which he provides relevance feedback. In addition the medical expert of the system 101 defines segment 403. The feedback receiving unit 106 further receives negative feedback (irrelevant) for segment 403 and positive (relevant) feedback for segments 402.

Figure 5:
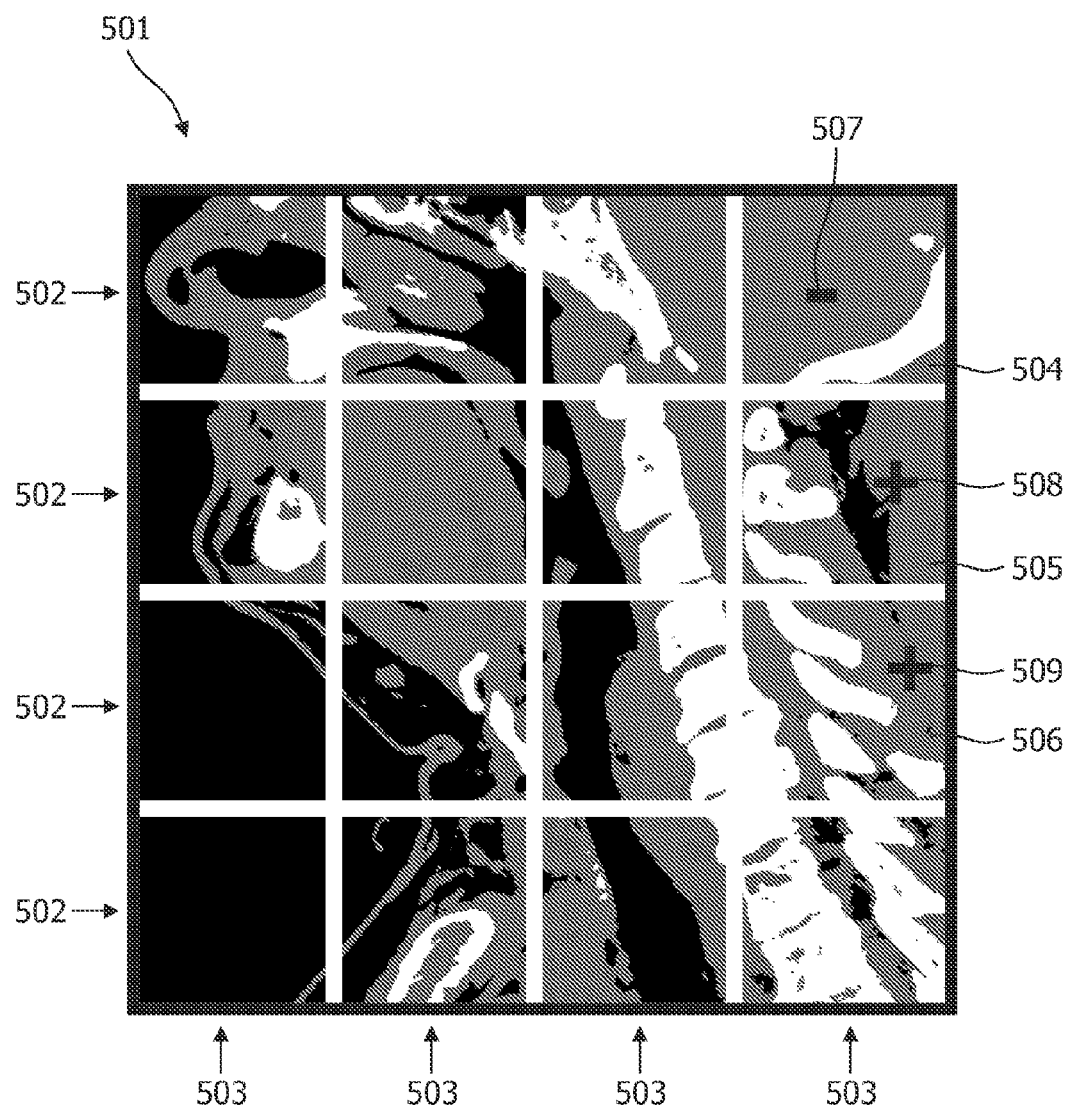
FIG. 5 shows a schematic view of a CT scan of the neck with proposed candidate segments according to a grid.

In FIG. 5 shows a candidate image 501 that is presented on the display of the presentation unit 105. The candidate image 501 is generated on basis of several CT scans of the neck and head of a patient. A multiplanar reconstruction technique is used to create a cross-cut of the neck and lower part of the head at the vertebral column seen from the flank (this is a sagittal view of the neck and the lower part of the head).

The segment proposal unit 107 proposes candidate segments on basis of a subdivision of the image according to a grid. The candidate segments are presented by the presentation unit 105 to the user. As can be seen in FIG. 5 the candidate image 501 is subdivided into rows 502 and columns 503. The user that reviews the candidate image indicates to the feedback receiving unit 106 that he wants to provide feedback to the candidate segments 504 to 506. Subsequently the user indicates that segment 504 is irrelevant, which is shown with the indication 507. The display of the presentation unit 105 shows the "negative" indication 507. The user indicates that segments 505 and 506 are relevant, which is shown by the "positive" indications 508 and 509.

In a further embodiment the user provides relevance feedback on the features of contents of the segments. If, for example, the candidate image 501 has in segment 505 a higher average intensity than expected, which is called hyperintensity, the user provides the feedback receiving unit the feedback that the hyperintensity segment 505 is relevant or irrelevant. If the hyperintensity of a segment is relevant, it means for the system that it has to search for improved candidate images with an equal average intensity in the part of the improved candidate image that matches with the average intensity of the segment on which feedback was provided. If the hyperintensity of a segment is irrelevant it means that the improved candidate image has to have a lower intensity in the part of the image than the intensity in the segment to which the relevance feedback relates.

Figure 6:
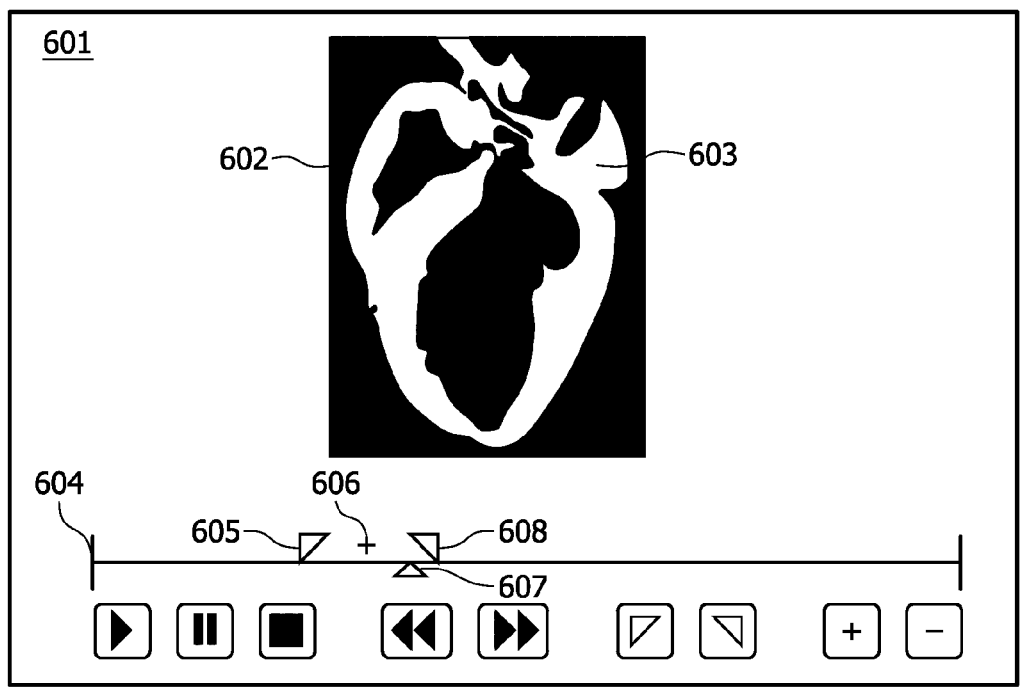
FIG. 6 shows a schematic view of the presentation of a data type of a video.

In another embodiment, discussed together with FIG. 6, the data objects in the database 104 may be video fragments of pulsations of the human heart. The medical expert is looking for a video that shows a specific behavior of one of the valves 603 of the heart. Based on a search query the search unit 103 found a candidate video fragment that is presented to the medical expert. FIG. 6 shows in a display image 601 a user interface of the system 101 that is presented on the display of the presentation unit 105 at the moment that the presentation unit 105 presents the candidate video fragment. To review the candidate video fragment the user interface provides the user with a video player. In window 602 the candidate video fragment is presented. The user interface shows time line 604. Indicator 607 shows where the currently shown video image in window 602 is located on the time line. The feedback receiving unit 106 receives via the user interface relevance feedback on a segment of the candidate video fragment. The segment is a part of the time line of the candidate video fragment and as such the segment is a temporal partition of the candidate video fragment. The user interface in FIG. 6 shows that the medical expert defined a segment of the time line that starts at indication 605 and ends at indication 608. As can be seen by the positive indicator 606 the medical expert provided positive feedback.

In another embodiment the defined segment of FIG. 6 is combined with a spatial partition of the video fragment because the medical expert want to have the search more focused on a specific part of the heart, for example around valve 603. A spatial subdivision of a video fragment means that the segment defines a part of each of the images in a set of consecutive video images.

Figure 7:
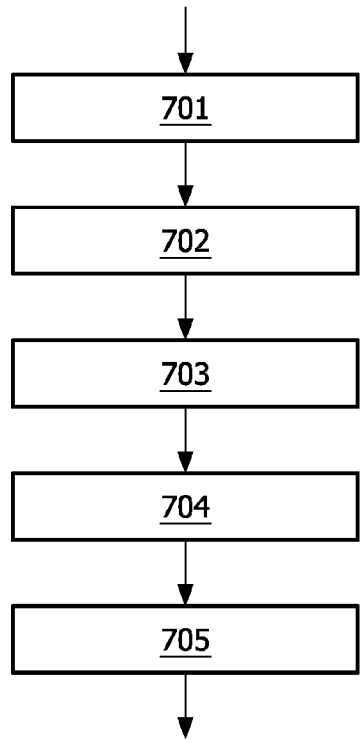
FIG. 7 shows a flow diagram of a method for identifying a particular data object in a database.

FIG. 7 shows another embodiment of the invention. FIG. 7 shows a flow diagram of a method to identify a particular data object in a database. In step 701 a search query is composed to identify a candidate data object which is a candidate for the particular data object. In step 702 the candidate data object is identified in the database based on a search query. In step 703 the candidate data object is presented to the user. In step 704 user feedback on the relevance or irrelevance of a segment of the candidate data object is received. In step 705 an improved candidate data object is identified in the database in response to the received user feedback. The improved candidate data object is an improved candidate for the particular data object.

The method of FIG. 7 may be implemented in a computer program product. The computer program product comprises computer instructions for causing a processor system to perform the steps of the method of FIG. 7.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for identifying a particular data object of a data type in a database comprising data objects of the data type, the system comprises:
one or more processors configured to:
compose a search query to identify a candidate data object being a candidate for the particular data object, wherein the one or more processors receive as an input an image and compose the search query from the received image to include a feature matrix;
identify, based on the search query, the candidate data object in the database by comparing feature matrices of images in a database with the feature matrix of the search query and identifying the candidate image as an image in the database with a feature matrix that is similar to the feature matrix of the search query;
present the candidate data object to the user;
receive user feedback on the relevance or irrelevance of at least two segments of a plurality of segments of the same candidate data object, wherein the at least two segments of the plurality of segments of the candidate data object includes user defined segments of the candidate data object, wherein at least one of the at least two segments is relevant and the other of the at least two segments is irrelevant, wherein each of the user defined segments is a different defined portion of the image that pertains to a particular feature and the at least one of the at least two segments is deemed relevant in response to the user feedback and the other of the at least two segments is deemed irrelevant in response to the user feedback; and
identify an improved candidate data object in response to the received user feedback, wherein the improved candidate data object is an improved candidate for the particular data object.

2. The system according to claim 1, wherein the segments are formed by a spatial partition or a temporal partition of the candidate data object, or the segments are formed by a combination of the spatial partition and the temporal partition of the candidate data object.

3. The system according to claim 2, wherein the spatial partition of the candidate data object is a two dimensional or three dimensional spatial partition of the candidate data object.

4. The system according to claim 1, where the one or more processors are further configured to propose a set candidate segments being segments of the candidate object, present the candidate segments of the set of candidate segments in combination with the candidate data object to the user, and receive an indication from the user which of the candidate segments are the segments on which user feedback is received by the one or more processors.

5. The system according to claim 4, wherein the data objects are medical data objects, and wherein the one or more processors are configured to propose the set of candidate segments based on anatomically defined parts of a body.

6. The system according to claim 4, wherein the one or more processors are configured to propose the set of candidate segments based on a partitioning of the candidate data object according to a grid.

7. The system according to claim 1, wherein the candidate data object is a single image, and the at least two segments represent two different regions in the same single image.

8. The system according to claim 1, wherein the or more processors are configured to receive a ranking of the at least two segments of the candidate data object, wherein the ranking expresses which one of the at least two segments is more important for the user than the other one of the at least two segments.

9. The system according to claim 1, wherein the one or more processors are configured to receive user feedback on the relevance or irrelevant of a feature of the content of the segment of the candidate data object.

10. The system according to claim 1, wherein the identification of the improved candidate data object is performed by updating the search query in response to the received user feedback and by identifying the improved candidate data object based on the updated search query.

11. The system according to claim 1, wherein the identification of the improved candidate data object is performed by identifying a first list of candidate data objects in response to the search query, by identifying a second list of candidate data objects in response to the received user feedback, and by selecting the improved candidate data object from the first list or the second list.

12. The system according to claim 1, wherein the data type is one of the following data types: an image, a three dimensional representation of an object or an environment, a video, or an audio fragment.

13. The system according to claim 1, wherein the feature matrix includes columns of feature vectors, each comprising a distribution of different color tones in a R, G and B channel of a part of the image.

14. The system according to claim 1, wherein the one or more processors are configured to identify the improved candidate data object by searching for a particular image has a segment that is similar to the at least one of the at least two segments that is deemed relevant in response to the user feedback.

15. The system according to claim 14, wherein the one or more processors are configured to update the feature matrix of the search query by changing a column of the feature matrix based on the feature vector of the segment of the candidate image, wherein a column is updated based on an overlap of the segment with parts of the images that are represented with separated feature vectors, and wherein a degree of the update depends on an amount of the overlap.

16. The system according to claim 15, wherein the one or more processors are configured to use the updated feature matrix to identify the improved candidate image, wherein the improved candidate image is different from the candidate image in response to another image having a feature matrix that is more similar to the updated feature matrix than the candidate image, and is the same as the candidate image in response to the candidate image having the feature matrix that is most similar to the updated feature matrix.

17. The system according to claim 16, wherein the one or more processors are configured to identify the improved candidate data object by searching for the particular image where the segment is dissimilar to the at least one of the at least two segments that is deemed irrelevant in response to the user feedback.

18. A method of identifying a particular data object of a data type in a database comprising data objects of the data type, the method comprises the steps of:
   composing a search query to identify a candidate data object being a candidate for the particular data object based on an input image, wherein the search query include a feature matrix,
   identifying, based on the search query, the candidate data object in the database by comparing feature matrices of images in a database with the feature matrix of the search query and identifying the candidate image as an image in the database with a feature matrix that is similar to the feature matrix of the search query,
   presenting the candidate data object to a user,
   receiving user feedback on the relevance or irrelevance of at least two segments of a plurality of segments of the same candidate data object, wherein the at least two segments of the plurality of segments of the candidate data object includes user defined segments of the candidate data object, wherein at least one of the at least two segments is relevant and the other of the at least two segments is irrelevant, wherein each of the user defined segments is a different defined portion of the image that pertains to a particular feature and the at least one of the at least two segments is deemed relevant in response to the user feedback and the other of the at least two segments is deemed irrelevant in response to the user feedback, and
   identifying an improved candidate data object in response to the received user feedback, wherein the improved candidate data object is an improved candidate for the particular data object.

19. A non-transitory computer readable medium encoded with computer executable instructions which when executed by a processor of a computer causes the processor to:
   compose a search query to identify a candidate data object being a candidate for the particular data object based on an input image, wherein the search query include a feature matrix,
   identify, based on the search query, the candidate data object in the database by comparing feature matrices of images in a database with the feature matrix of the search query and identifying the candidate image as an image in the database with a feature matrix that is similar to the feature matrix of the search query,
   present the candidate data object to a user,
   receive user feedback on the relevance or irrelevance of at least two segments of a plurality of segments of the same candidate data object, wherein the at least two segments of the plurality of segments of the candidate data object includes user defined segments of the candidate data object, wherein at least one of the at least two segments is relevant and the other of the at least two segments is irrelevant, wherein each of the user defined segments is a different defined portion of the image that pertains to a particular feature and the at least one of the at least two segments is deemed relevant in response to the user feedback and the other of the at least two segments is deemed irrelevant in response to the user feedback, and
   identify an improved candidate data object in response to the received user feedback, wherein the improved candidate data object is an improved candidate for the particular data object.

* * * * *